(12) United States Patent
Sikkink et al.

(10) Patent No.: US 12,461,736 B2
(45) Date of Patent: Nov. 4, 2025

(54) SOFTWARE DEPLOYMENT AMONG DIFFERENT COMPUTING PLATFORMS

(71) Applicants: Jeffrey Alan Sikkink, Longmont, CO (US); Michael Glen Lotz, Longmont, CO (US); Matthew Kellerman, Boulder, CO (US); Marquis G. Waller, Beverly, OH (US)

(72) Inventors: Jeffrey Alan Sikkink, Longmont, CO (US); Michael Glen Lotz, Longmont, CO (US); Matthew Kellerman, Boulder, CO (US); Marquis G. Waller, Beverly, OH (US)

(73) Assignee: Ricoh Company, Ltd., Tokyo (JP)

( * ) Notice: Subject to any disclaimer, the term of this patent is extended or adjusted under 35 U.S.C. 154(b) by 234 days.

(21) Appl. No.: 18/116,200

(22) Filed: Mar. 1, 2023

(65) Prior Publication Data
US 2024/0296036 A1  Sep. 5, 2024

(51) Int. Cl.
  *G06F 9/44* (2018.01)
  *G06F 8/65* (2018.01)
  *G06F 9/50* (2006.01)
  *G06Q 30/0283* (2023.01)

(52) U.S. Cl.
  CPC .............. *G06F 8/65* (2013.01); *G06F 9/5077* (2013.01); *G06Q 30/0283* (2013.01)

(58) Field of Classification Search
  CPC ...... G06F 8/65; G06F 9/5077; G06Q 30/0283
  See application file for complete search history.

(56) References Cited

U.S. PATENT DOCUMENTS

| | | | |
|---|---|---|---|
| 11,269,596 B2 | 3/2022 | Appel et al. | |
| 2003/0018950 A1* | 1/2003 | Sparks | G06F 9/4491 717/100 |
| 2009/0132801 A1* | 5/2009 | White | G06F 9/44505 713/100 |

(Continued)

FOREIGN PATENT DOCUMENTS

| CN | 111158655 A | 5/2020 |
|---|---|---|
| CN | 112783771 A | 5/2021 |

(Continued)

*Primary Examiner* — Qamrun Nahar
(74) *Attorney, Agent, or Firm* — Duft & Bornsen, PC

(57) ABSTRACT

System, method, and software for software deployment. In an embodiment, a software deployment supervisor receives deployment parameters from an entity regarding deployment of software, identifies resource information for resources on a plurality of computing platforms to host the software, select a host computing platform based on the deployment parameters and the resource information, and deploy the software on the host computing platform. The software deployment supervisor implements a redeployment process by iteratively performing: monitoring the resource information to identify updated resource information for one or more of the resources, identifying downtime of the software, reselecting the host computing platform from the plurality of computing platforms based on the deployment parameters and the updated resource information, and redeploying the software on the host computing platform during the downtime of the software.

20 Claims, 9 Drawing Sheets

(56) References Cited

U.S. PATENT DOCUMENTS

| | | | | |
|---|---|---|---|---|
| 2010/0146481 A1* | 6/2010 | Binder | .................... | G06F 8/656 |
| | | | | 717/110 |
| 2014/0359578 A1* | 12/2014 | Jesse | ........................ | G06F 8/61 |
| | | | | 717/124 |
| 2020/0401379 A1* | 12/2020 | Appel | ....................... | G06F 8/61 |

FOREIGN PATENT DOCUMENTS

| CN | 113360379 A | 9/2021 |
|---|---|---|
| CN | 114780397 A | 7/2022 |

\* cited by examiner

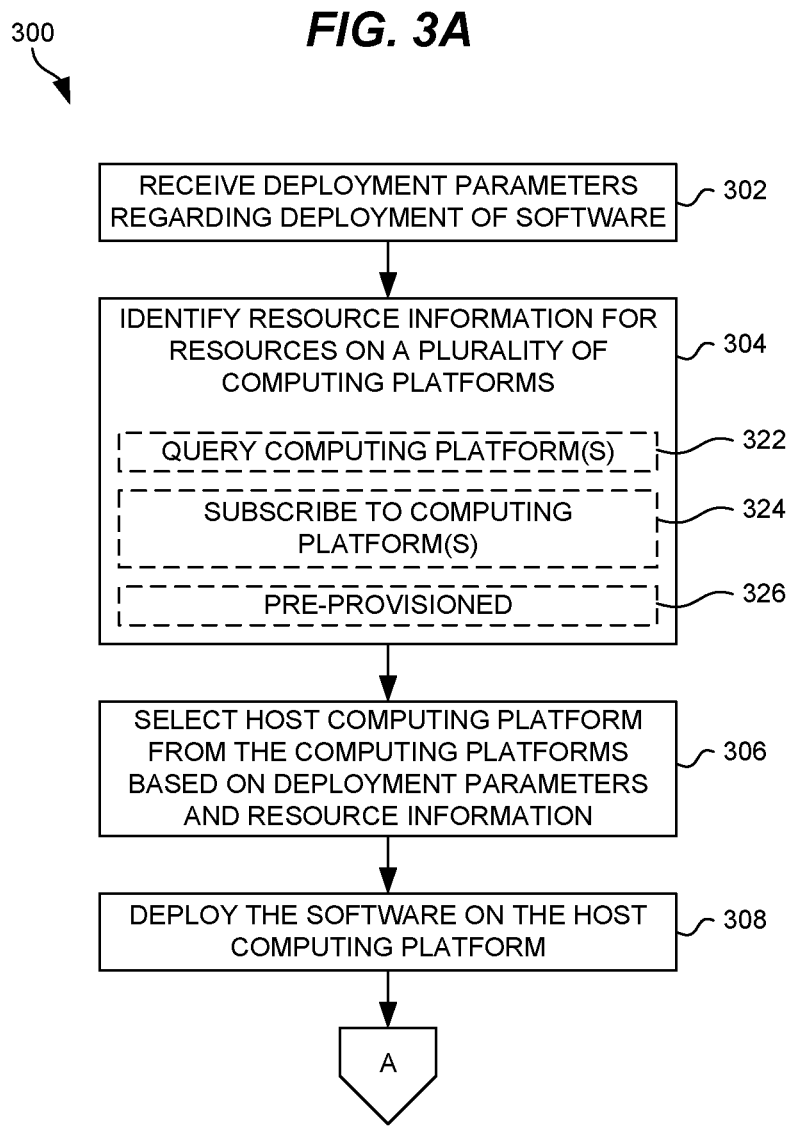

SOFTWARE DEPLOYMENT AMONG DIFFERENT COMPUTING PLATFORMS

TECHNICAL FIELD

The following disclosure relates to the field of computing platforms, and more particularly, to deployment of software on computing platforms.

BACKGROUND

Software deployment is the process of making software available for use on a platform by users and/or other programs. Software may be deployed on a variety of computing platforms, and it may be difficult to choose which computing platform to use. For example, software may be deployed at an on-premise computing platform or a cloud computing platform. There are multiple cloud computing platforms available from different cloud service providers, such as Amazon Web Services (AWS), Google Cloud, Microsoft Azure, etc. Therefore, it may be difficult to choose which platform to use for software deployment.

SUMMARY

Embodiments described herein include a software deployment supervisor and associated methods. In an embodiment, a software deployment supervisor selects a computing platform from among a plurality of different computing platforms based on parameters and resource information for resources on the different computing platforms, and deploys the software on the selected computing platform. After deployment, the software deployment supervisor monitors for changes or updates in the resource information. For example, pricing for resources on the different computing platforms may change after deployment. The software deployment supervisor may redeploy the software on a different computing platform based on the updated resource information. One technical benefit is the software deployment supervisor provides an automated solution for automatically selecting a computing platform and automatically deploying the software on the selected computing platform. Another technical benefit is the software deployment supervisor is able to move the software between the different computing platforms to optimize cost, improve performance, etc., of the software.

In an embodiment, a software deployment supervisor comprises at least one processor and memory, where the at least one processor is configured to cause the software deployment supervisor at least to receive deployment parameters from an entity regarding deployment of software, identify resource information for resources on a plurality of computing platforms to host the software, select a host computing platform from the plurality of computing platforms based on the deployment parameters and the resource information, and deploy the software on the host computing platform. The at least one processor is configured to further cause the software deployment supervisor at least to implement a redeployment process by iteratively performing: monitoring the resource information to identify updated resource information for one or more of the resources on the plurality of computing platforms, identifying downtime of the software deployed on the host computing platform, reselecting the host computing platform from the plurality of computing platforms based on the deployment parameters and the updated resource information, and redeploying the software on the host computing platform during the downtime of the software when the host computing platform reselected based on the updated resource information differs from the host computing platform where the software is presently deployed.

In an embodiment, a method of deploying software comprises receiving deployment parameters from an entity regarding deployment of the software, identifying resource information for resources on a plurality of computing platforms to host the software, selecting a host computing platform from the plurality of computing platforms based on the deployment parameters and the resource information, and deploying the software on the host computing platform. The method further comprises implementing a redeployment process by iteratively performing: monitoring the resource information to identify updated resource information for one or more of the resources on the plurality of computing platforms, identifying downtime of the software deployed on the host computing platform, reselecting the host computing platform from the plurality of computing platforms based on the deployment parameters and the updated resource information, and redeploying the software on the host computing platform during the downtime of the software when the host computing platform reselected based on the updated resource information differs from the host computing platform where the software is presently deployed.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIGS. 3A-3B are flow charts illustrating a method of performing software deployment in an illustrative embodiment.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
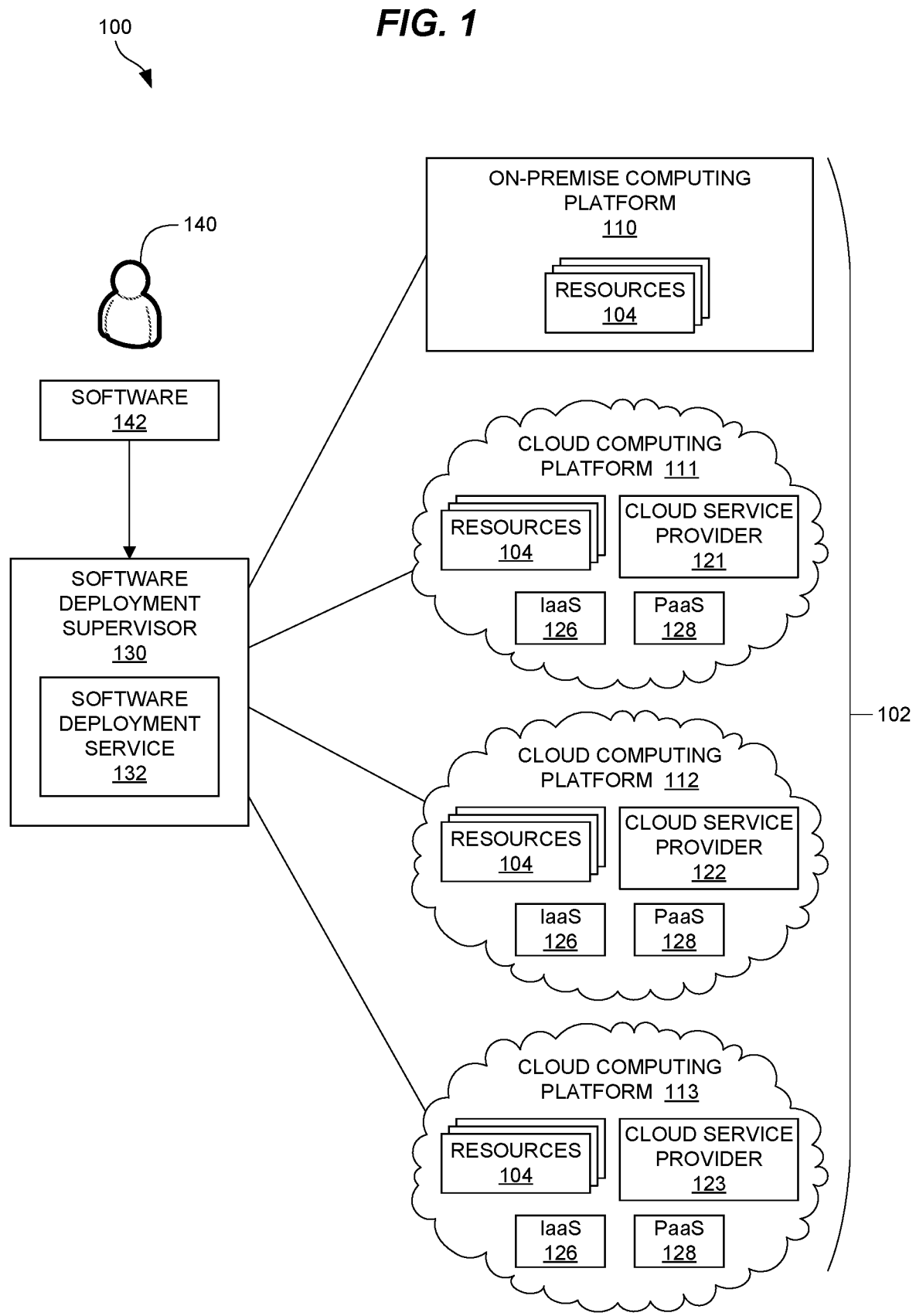
FIG. 1 illustrates a computing environment in an illustrative embodiment.

FIG. 1 illustrates a computing environment 100 in an illustrative embodiment. Computing environment 100 includes a plurality of computing platforms 102. In general, each of the computing platforms 102 comprises resources 104 used in the deployment of software (i.e., used to host software). For example, the resources 104 may comprise compute resources (e.g., a server, a virtual server or virtual machine (VM), a virtual central processing unit (vCPU), etc.), storage resources, networking resources, etc. One or more of the computing platforms 102 may include an on-premise computing platform 110. An on-premise computing platform 110 comprises resources 104 managed by an entity (e.g., a person, a company, an organization, etc.). The entity manages the infrastructure (e.g., power, storage, servers, or other equipment), operating systems (OS), databases, etc., located at the physical site of the entity, rather than at a remote facility. The entity may own or lease/rent the equipment. Technical benefits of an on-premise computing platform 110 are a lower Total Cost of Ownership (TCO), and the entity has complete control over the hardware and software.

Other computing platforms 102 may include multiple cloud computing platforms 111-113. A cloud computing platform provides resources 104, including storage, processing power (i.e., compute), databases, networking, analytics, artificial intelligence, and software applications, over an internet connection. In an embodiment, cloud computing platforms 111-113 are provided by different cloud service providers 121-123, respectively, such as AWS, Google Cloud, and Microsoft Azure, although other cloud service providers are considered herein. A cloud service provider 121-123 is a company that establishes and manages a cloud computing platform, and offers one or more cloud computing services. Technical benefits of a cloud computing platform 111-113 are little or no upfront costs, high levels of security, and scalability. Computing environment 100 may include other types of computing platforms 102 not illustrated.

One type of cloud computing service is Infrastructure-as-a-Service (IaaS) 126. IaaS 126 is a type of cloud computing service that provides compute, storage, and networking resources, while a customer is responsible for operating systems, middleware, applications, etc. Another type of cloud computing service is Platform-as-a-Service (PaaS) 128. PaaS 128 is a type of cloud computing service that, like IaaS 126, provides compute, storage, and networking resources, but also provides operating systems, middleware, applications (e.g., development tools, database management, and business analytics), etc.

Computing environment 100 further includes a software deployment supervisor 130. A software deployment supervisor 130 is an apparatus, system, server, equipment, device, etc., configured to perform software deployment on one or more computing platforms 102. Assume, for example, that a customer 140 (e.g., a person, an organization, or another entity) creates, owns, or otherwise possesses software 142, and is deciding where to deploy the software 142. Software deployment supervisor 130 provides a software deployment service 132 that automates deployment of software across different computing platforms 102. In an embodiment, the software deployment service 132 may also monitor deployed software, and automate redeployment of the software across computing platforms 102.

Figure 2:
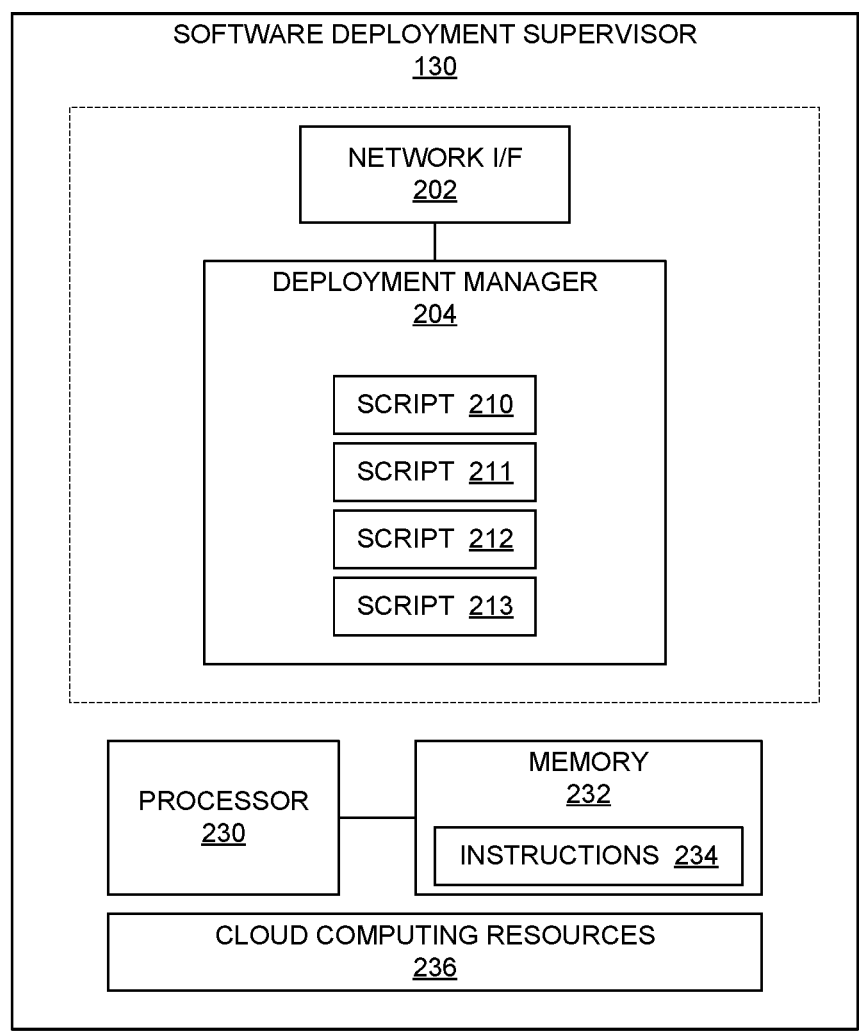
FIG. 2 is a block diagram of a software deployment supervisor in an illustrative embodiment.

FIG. 2 is a block diagram of software deployment supervisor 130 in an illustrative embodiment. In an embodiment, software deployment supervisor 130 includes the following sub-systems: a network interface component 202 and a deployment manager 204. Network interface component 202 may comprise circuitry, logic, hardware, means, etc., configured to communicate with external devices or systems over a network. For example, network interface component 202 may send or receive data or files over a network, exchange messages, commands, calls, etc., over a network (e.g., via an Application Programming Interface (API) of a computing platform 102), or otherwise communicate over a network. A network as described herein may comprise a wide area network (e.g., the internet), a local area network, an enterprise network, etc.

Deployment manager 204 may comprise circuitry, logic, hardware, means, etc., configured to select a host computing platform for a software deployment, and deploy the software on the host computing platform. For example, deployment manager 204 may receive one or more deployment parameters (e.g., from a customer 140), determine or identify resource information for resources 104 on the computing platforms 102, and select a host computing platform accordingly. Deployment manager 204 may then deploy the software on the host computing platform. For example, deployment manager 204 may provision the resources 104 on the host computing platform (if needed), and perform functions or actions to install the software on the host computing platform. Deployment manager 204 is further configured to implement a redeployment process after the software is deployed on a host computing platform. While the host computing platform may be appropriate at the time of deployment, the resource information may change regarding one or more of the computing platforms 102, one or more deployment parameters may change, etc. Thus, deployment manager 204 is configured to monitor for updated resource information for resources 104 on the computing platforms 102 and/or receive updated deployment parameters, and reselect the host computing platform accordingly. Deployment manager 204 is configured to redeploy the software on a different host computing platform based on the reselection during downtime of the software (i.e., selected a different host computing platform based on updated resource information and/or updated deployment parameters). One technical benefit is software deployment supervisor 130 provides an automated solution for automatically selecting a computing platform and automatically deploying the software on the selected computing platform. Another technical benefit is software deployment supervisor 130 is able to move software among the different computing platforms 102 to optimize cost, improve performance, etc., of the software.

One or more of the subsystems of software deployment supervisor 130 may be implemented on a hardware platform comprised of analog and/or digital circuitry. One or more of the subsystems of software deployment supervisor 130 may be implemented on one or more processors 230 that execute instructions 234 (i.e., computer readable code) for software that are loaded into memory 232. A processor 230 comprises an integrated hardware circuit configured to execute instructions 234 to provide the functions of software deployment supervisor 130. Processor 230 may comprise a set of one or more processors or may comprise a multi-processor core, depending on the particular implementation. Memory 232 is a non-transitory computer readable storage medium for data, instructions, applications, etc., and is accessible by processor 230. Memory 232 is a hardware storage device capable of storing information on a temporary basis and/or a permanent basis. Memory 232 may comprise a random-access memory, or any other volatile or non-volatile storage device. One or more of the subsystems of software deployment supervisor 130 may be implemented on a cloud computing resources 236 (e.g., one of cloud computing platforms 111-113 or another cloud computing platform).

Software deployment supervisor 130 may include various other components not specifically illustrated in FIG. 2.

Figure 3B:
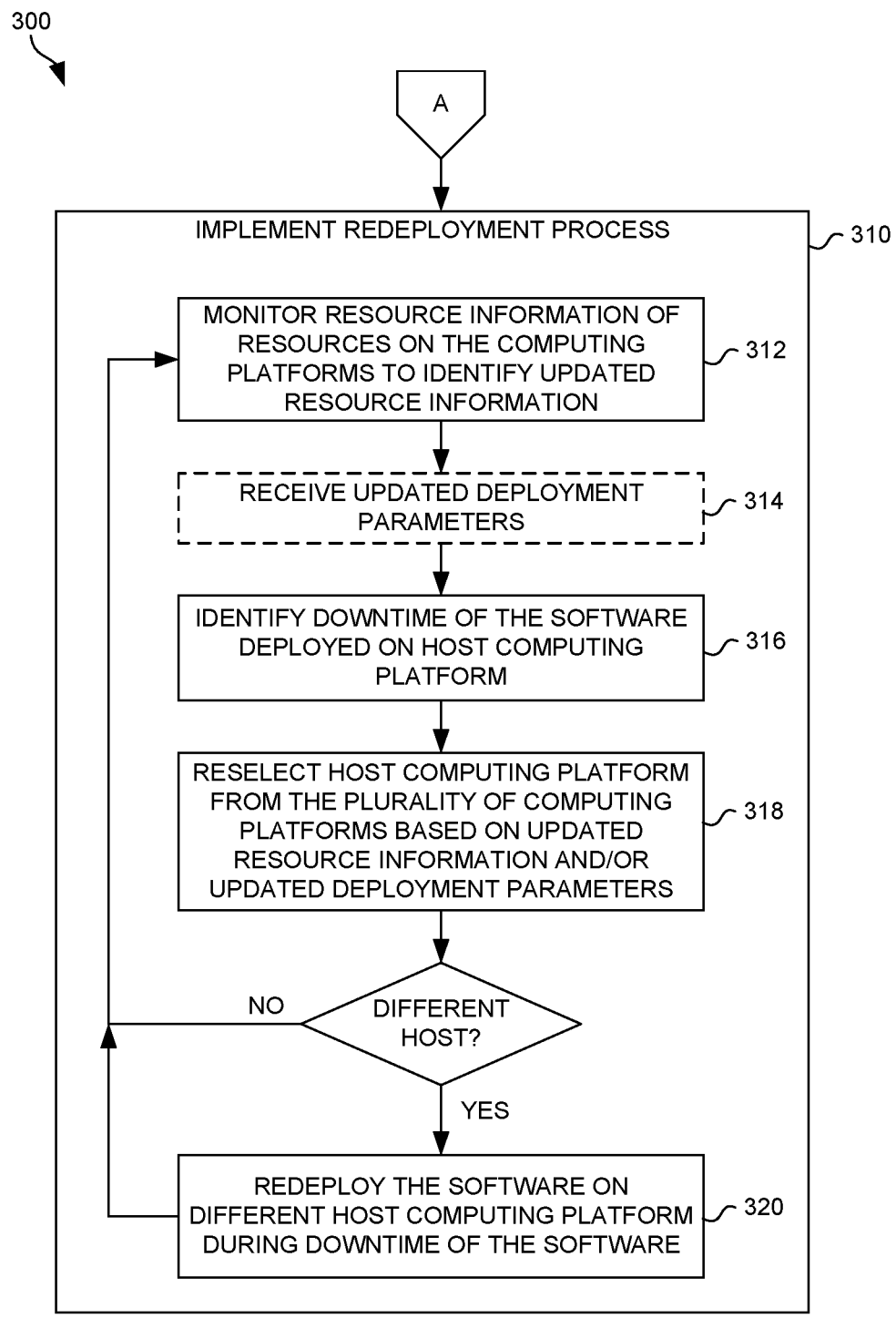

FIGS. 3A-3B are flow charts illustrating a method 300 of performing software deployment in an illustrative embodiment. The steps of method 300 will be described with reference to software deployment supervisor 130 in FIG. 2, but those skilled in the art will appreciate that method 300 may be performed in other systems or devices. Also, the steps of the flow charts described herein are not all inclusive and may include other steps not shown, and the steps may be performed in an alternative order.

Figure 4:
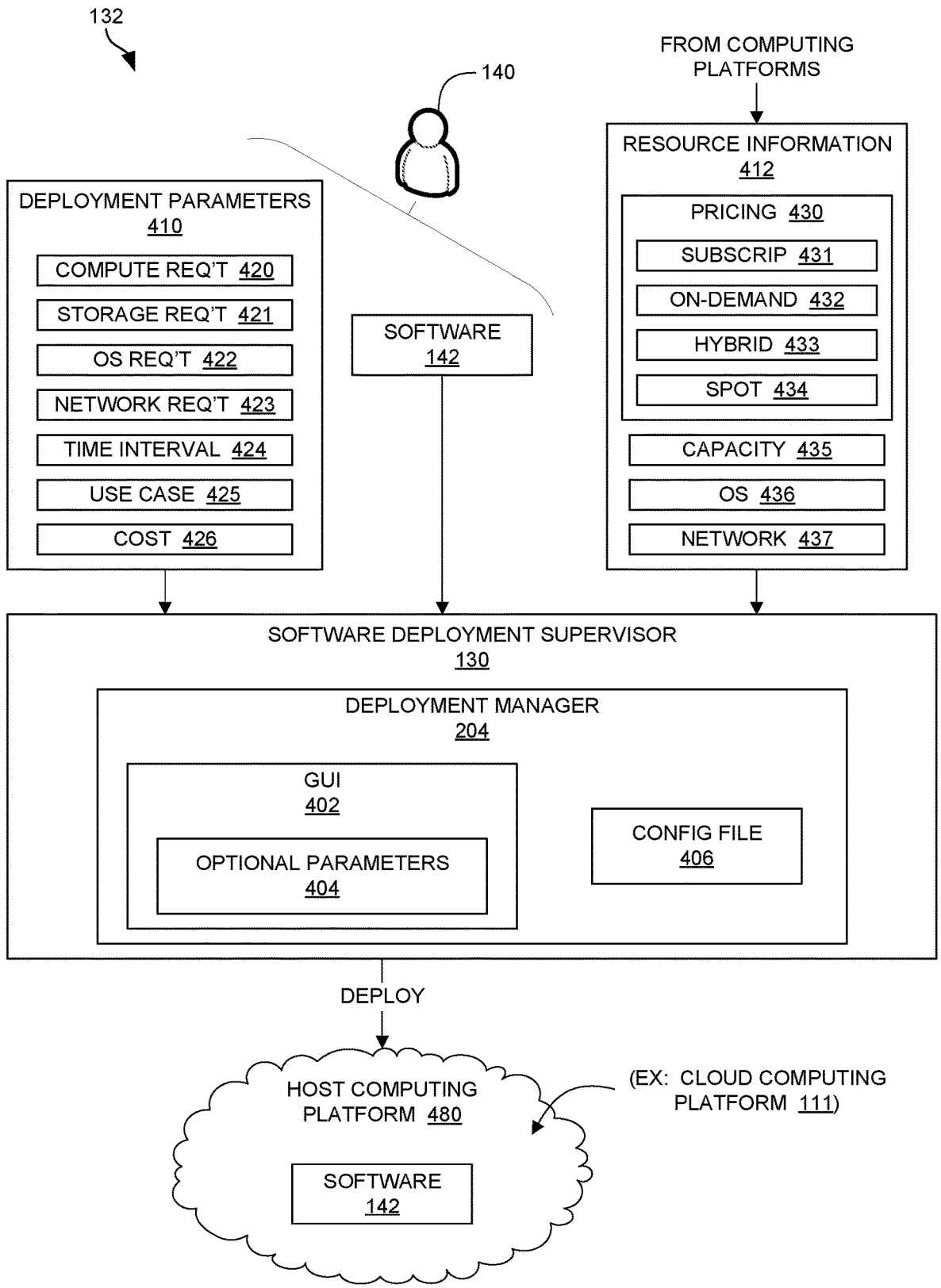
FIG. 4 illustrates a software deployment service in an illustrative embodiment.

In FIG. 3A, deployment manager 204 receives deployment parameters from a customer 140 of the software deployment service 132 (also generally referred to as an entity) regarding deployment of software 142 (step 302). FIG. 4 illustrates the software deployment service 132 in an illustrative embodiment. As shown, customer 140 provides deployment parameters 410 to software deployment supervisor 130 for the software deployment service 132. The deployment parameters 410 comprise any inputs, requirements, or other factors for deploying the software 142. As an example, the deployment parameters 410 may comprise compute requirements 420, storage requirements 421, operating system (OS) requirements 422 (e.g., type of OS, whether customer 140 has a license for the OS, etc.), network access requirements 423 (e.g., whether the software 142 needs outside access to the web), operational window(s) or time interval(s) 424 of the software 142 (e.g., an operating duration or time frames when software 142 is operational), use case 425 (e.g., test, performance, etc.), cost range or limit 426, etc. The list of deployment parameters 410 provided in FIG. 4 is not exhaustive, and other parameters are considered herein. Deployment manager 204 may receive the deployment parameters 410 in a variety of ways. In an example, deployment manager 204 may provide or implement a Graphical User Interface (GUI) 402 through a website, portal, etc., where customer 140 is able to enter or input the deployment parameters 410. GUI 402 may provide a list of optional deployment parameters 404 selectable by the customer 140. In another example, deployment manager 204 may provide website, a portal, etc., where customer 140 is able to upload a configuration file 406 with the deployment parameters 410. Customer 140 may also provide a copy of the software 142 (e.g., an application), a link (e.g., network address or Uniform Resource Locator (URL)) to the software 142, etc., to deployment manager 204.

In FIG. 3A, deployment manager 204 identifies resource information for resources 104 on a plurality of computing platforms 102 (step 304). The resource information may comprise compute capacity, storage capacity, network performance, pricing or pricing plan, and/or any other information related to resources 104 at a computing platform 102. In an embodiment, deployment manager 204 may query one or more of the computing platforms 102 to obtain the resource information (optional step 322), such as through network interface component 202. In an embodiment, deployment manager 204 may subscribe to one or more of the computing platforms 102 to be notified of the resource information (optional step 324). In an embodiment, deployment manager 204 may be pre-provisioned with the resource information for one or more computing platforms 102 (optional step 326). However, deployment manager 204 may identify or receive the resource information in other ways.

In FIG. 4, for example, the resource information 412 may comprise pricing 430 (also referred to as pricing information) for resources 104 on the computing platforms 102. The pricing 430 may comprise subscription-based pricing 431 (e.g., price per month), usage-based or on-demand pricing 432, hybrid pricing 433 (e.g., combination of subscription-based and on-demand pricing), auction-based spot pricing 434 (e.g., allowing users to bid for resources at a reduced rate), and/or other types of pricing. The resource information 412 may comprise resource capacity 435, such as capacity of compute resources, storage resources, network resources, etc. The resource information 412 may comprise a type of operating system 436 supported. The resource information 412 may comprise network accessibility 437. The list of resource information 412 provided in FIG. 4 is not exhaustive, and other types of resource information 412 are considered herein.

In FIG. 3A, deployment manager 204 selects a host computing platform from the computing platforms 102 based on the deployment parameters 410 and the resource information 412 (step 306). A host computing platform comprises one of the computing platforms 102 selected for deployment of software 142 where the software is installed for operation. As in FIG. 4, for example, deployment manager 204 selects a host computing platform 480 (e.g., cloud computing platform 111) from among the computing platforms 102 that is most suitable for deployment of the software 142 based on the deployment parameters 410 and the resource information 412. Deployment manager 204 may use any local policies or rules as desired to select host computing platform 480.

In FIG. 3A, deployment manager 204 deploys the software 142 on the host computing platform 480 (step 308). To deploy software 142, deployment manager 204 may provision resources 104 on the host computing platform 480, install the software 142 on the host computing platform 480 (e.g., upload the software 142), etc. As shown in FIG. 2, deployment manager 204 may be provisioned with one or more scripts 210-213 that automate deployment of software. As computing platforms 102 may use different commands, different names for resources, different APIs, etc., each script 210-213 may be customized or specific to an individual computing platform 102. For example, script 210 may be customized or specific to on-premise computing platform 110, script 211 may be customized or specific to cloud computing platform 111, script 212 may be customized or specific to cloud computing platform 112, and script 213 may be customized or specific to cloud computing platform 113. Deployment manager 204 may then run or execute the script 210-213 associated with the host computing platform 480 to automatically deploy the software 142. One technical benefit is the software 142 is automatically deployed on a host computing platform 480 via the software deployment service 132 with minimal input or effort from the customer 140.

Although the host computing platform 480 may be suitable for deployment at the time of selection (as in step 306), conditions may change. In FIG. 3B, after deployment of software 142, deployment manager 204 implements a redeployment process (step 310). In general, for the redeployment process, deployment manager 204 looks for changes in the resource information 412 of the computing platforms 102 and/or deployment parameters 410 that may warrant moving the software 142 to a different computing platform 102 (i.e., change the host computing platform 480). To avoid any service interruption of the software 142, redeployment may occur during downtime of the software 142. Downtime of software refers to a time during which the software is unavailable, offline, or not operational. In an embodiment, it is assumed that software 142 is not continuously operational (e.g., 24/7), and there are intermittent time intervals of downtime. The downtime is a planned or scheduled event or occurrence, as opposed to an unplanned event, such as a system or hardware failure. Deployment manager 204 identifies downtime of the software 142 deployed on the host computing platform 480, and may redeploy the software on a different computing platform 102 during the downtime of the software 142, if appropriate.

Figure 5:
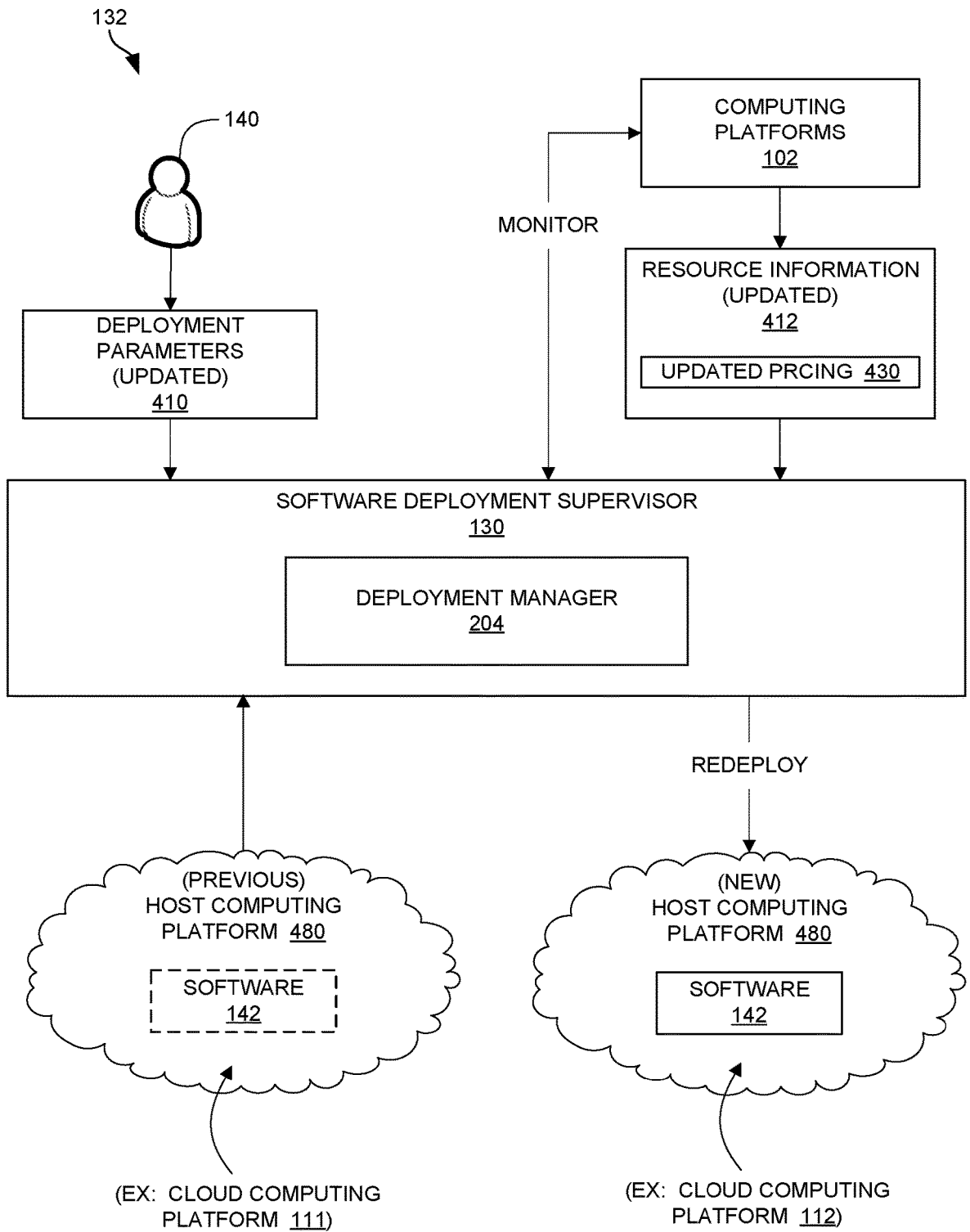
FIG. 5 further illustrates a software deployment service in an illustrative embodiment.

For the redeployment process, deployment manager 204 monitors the resource information 412 of the resources 104 on the computing platforms 102 to identify updated resource information 412 for one or more of the resources 104 (step 312). Deployment manager 204 may monitor the resource information 412 periodically, according to a schedule, etc., much as described above. For example, deployment manager 204 may monitor the resource information 412 by querying (e.g., periodically, according to a schedule, responsive to an event, etc.) one or more of the computing platforms 102 (optional step 322), may subscribe to one or more of the computing platforms 102 to be notified of updates to the resource information (optional step 324), etc. FIG. 5 further illustrates the software deployment service 132 in an illustrative embodiment. In monitoring the resource information 412, for example, deployment manager 204 identifies updated resource information 412 for one or more of the resources 104 on computing platforms 102. For example, the updated resource information 412 may include updated pricing 430 (e.g., updated subscription-based pricing 431, updated on-demand pricing 432, updated hybrid pricing 433, or updated auction-based spot pricing 434), and/or other updated information.

In FIG. 3B, deployment manager 204 may also receive updated deployment parameters from the customer 140 (optional step 314), much as described above. In FIG. 5, for example, deployment manager 204 may receive updated deployment parameters 410 from the customer 140.

In FIG. 3B, deployment manager 204 identifies downtime of the software 142 deployed on the host computing platform 480 (step 316). For example, deployment manager 204 may identify an operating time interval 424 specified for the software 142 provided in the deployment parameters 410 to identify the downtime of the software 142. In another example, deployment manager 204 may query the host computing platform 480 to identify the downtime of the software 142.

Deployment manager 204 reselects the host computing platform 480 from the plurality of computing platforms 102 based on the updated deployment parameters 410 and/or the updated resource information 412 (step 318). When the deployment manager 204 reselects the same host computing platform 480 where the software 142 is presently deployed, deployment manager 204 does not move the software 142 to another computing platform 102. When the deployment manager 204 reselects a different host computing platform 480 than where the software 142 is presently deployed, deployment manager 204 redeploys the software 142 on the different host computing platform 480 (e.g., cloud computing platform 112) during the downtime of the software 142 (step 320). In FIG. 5, for example, the software is presently deployed at host computing platform 480 (e.g., cloud computing platform 111). When deployment manager 204 reselects a different host computing platform 480 (e.g., cloud computing platform 112) based on the updated deployment parameters 410 and/or the updated resource information 412, deployment manager 204 redeploys the software 142 on the different host computing platform 480. In redeployment, deployment manager 204 deploys the software 142 on the different (new) host computing platform 480, and also tears down the software 142 on the previous host computing platform 480 during downtime of the software 142. One technical benefit is the software 142 may be moved to a different host computing platform 480 to optimize cost, improve performance, etc., of the software 142.

The redeployment process is an iterative process, so deployment manager 204 may repeat steps 312-320. One technical benefit is deployment manager 204 may continually search for an optimal computing platform 102 for the software 142, and move the software 142 accordingly.

Figure 6A:
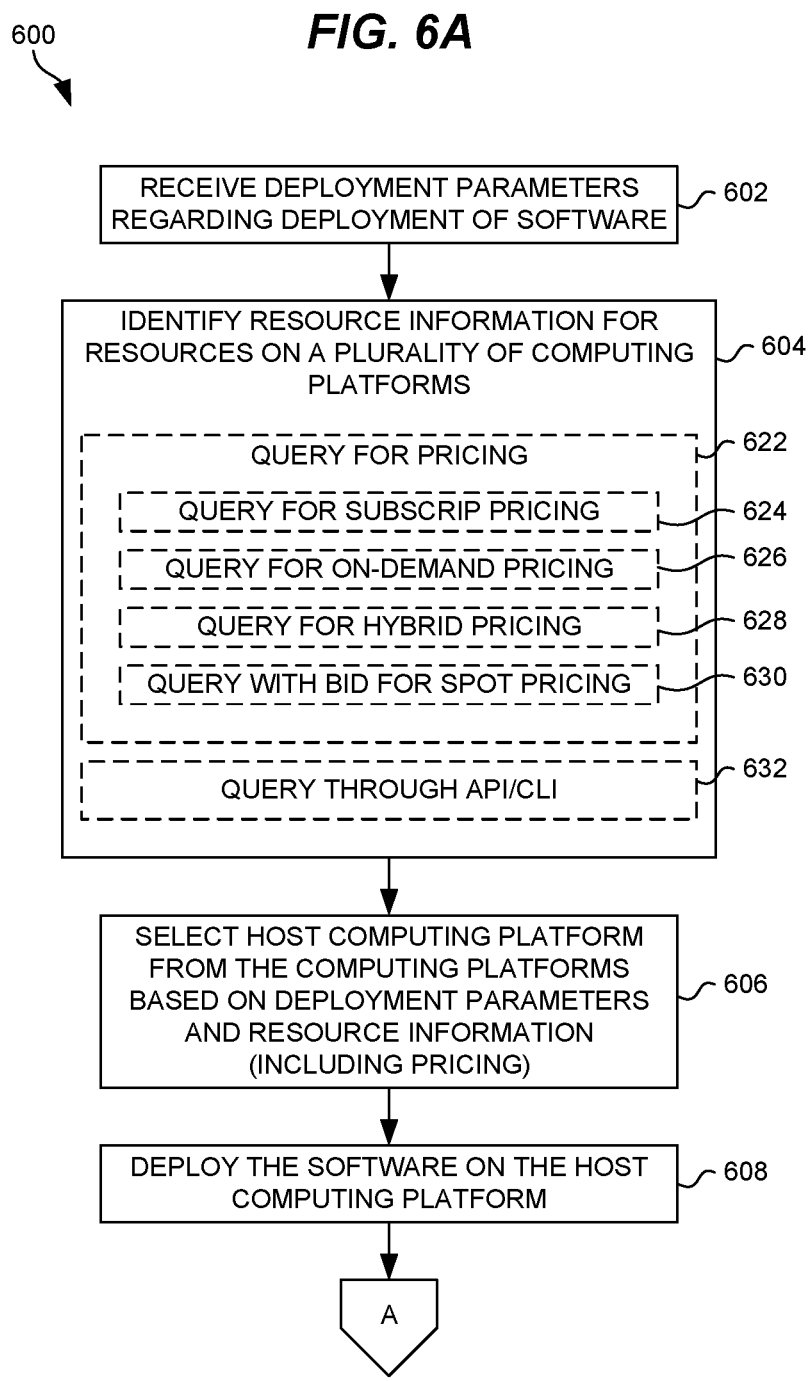
FIGS. 6A-6B are flow charts illustrating a method of performing software deployment in an illustrative embodiment.
Figure 6B:
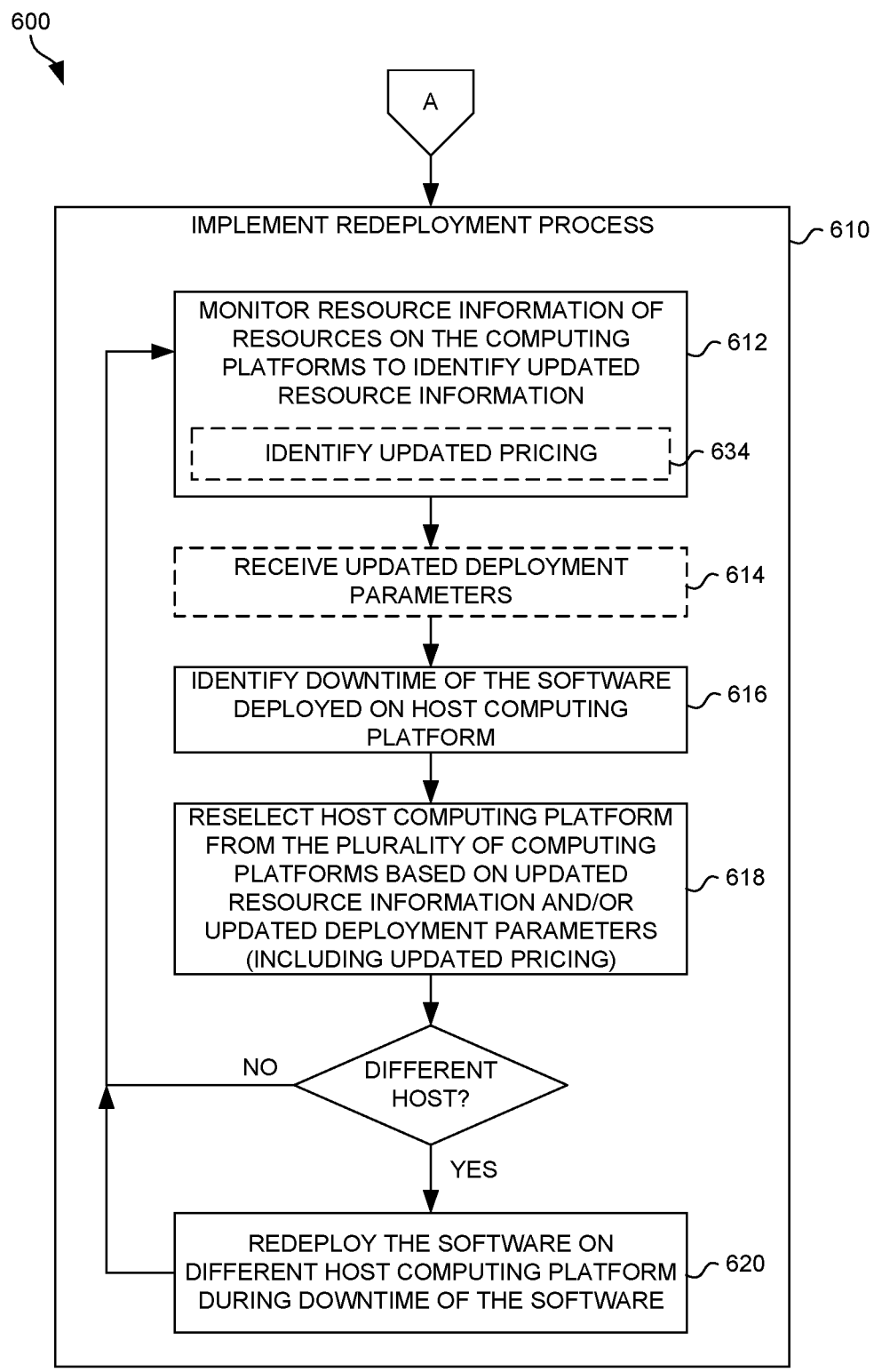

In an embodiment, deployment manager 204 may operate based on a policy to reduce cost or maximize cost savings for software deployment. FIGS. 6A-6B are flow charts illustrating a method 600 of performing software deployment in an illustrative embodiment. The steps of method 600 will be described with reference to software deployment supervisor 130 in FIG. 2, but those skilled in the art will appreciate that method 600 may be performed in other systems or devices. At least some of the steps of method 600 correspond with the steps of method 300, and the concepts described above may also apply to method 600.

Figure 7:
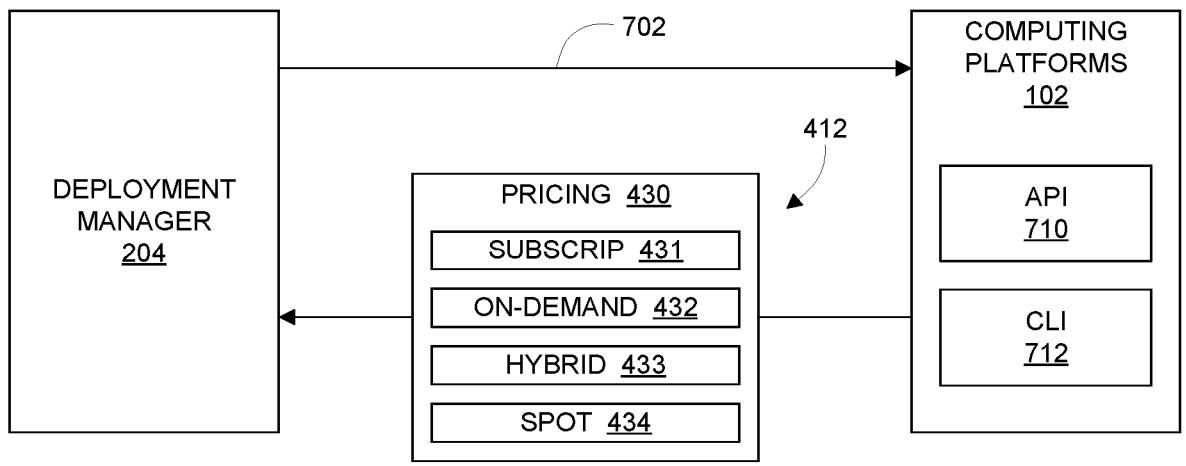
FIG. 7 illustrates a deployment manager acquiring resource information from computing platforms in an illustrative embodiment.

In FIG. 6A, deployment manager 204 receives deployment parameters 410 from a customer 140 of the software deployment service 132 regarding deployment of software 142 (step 602). Deployment manager 204 identifies resource information 412 for resources 104 on a plurality of computing platforms 102 (step 604). FIG. 7 illustrates deployment manager 204 acquiring resource information 412 from computing platforms 102 in an illustrative embodiment. In FIG. 7, the resource information 412 at least includes pricing 430 for the resources 104 used in the deployment of the software 142 (i.e., to host the software 142). In an embodiment, deployment manager 204 may query one or more of the computing platforms 102 to obtain the pricing 430 (optional step 622 in FIG. 6A), such as through network interface component 202. For example, deployment manager 204 may send a query 702 to one or more of the computing platforms 102, and receive the pricing 430 in response to the query 702. The query 702 may be for subscription-based pricing 431 (optional step 624), for on-demand pricing 432 (optional step 626), and/or for hybrid pricing 433 (optional step 628). In an embodiment, the query 702 may include a bid for auction-based spot pricing 434 (optional step 630). In response to a bid for auction-based spot pricing 434, the resource information 412 may include an acceptance of the bid and/or the price of an accepted bid for the auction-based spot pricing 434.

In an embodiment, computing platform 102 may provide an API 710 that allows deployment manager 204 to obtain the pricing 430, along with other resource information 412. In an embodiment, computing platform 102 may provide a command line interface (CLI) 712 that allows deployment manager 204 to obtain the pricing 430, along with other resource information 412. Thus, deployment manager 204 may query the computing platform 102 through API 710 or CLI 712 to obtain the pricing 430 (optional step 632 in FIG. 6A). As the different computing platforms 102 may provide different APIs 710 or CLIs 712, deployment manager 204 is configured to interact via the different APIs 710 and CLIs 712.

In FIG. 6A, deployment manager 204 selects a host computing platform 480 from the computing platforms 102 based on the deployment parameters 410 and the resource information 412 (step 606). In this embodiment, deployment manager 204 implements a cost reduction policy, so deployment manager 204 selects the host computing platform 480 based at least on the pricing 430 provided by the computing platforms 102. Deployment manager 204 then deploys the software 142 on the host computing platform 480 (step 608).

Although the host computing platform 480 may be suitable for deployment at the time of selection (as in step 606), conditions may change. For example, pricing 430 at the different computing platforms 102 may change after software 142 is deployed. In FIG. 6B, after deployment of software 142, deployment manager 204 implements a redeployment process (step 610). For the redeployment process, deployment manager 204 monitors the resource information 412 of the resources 104 on the computing platforms 102 to identify updated resource information 412 for one or more of the resources 104 (step 612). In this embodiment, deployment manager 204 monitors the resource information 412 of the resources 104 on the computing platforms 102 to identify updated pricing 430 for one or more of the resources 104 (optional step 634). Deployment manager 204 may monitor for updated pricing 430 periodically, according to a schedule, etc., much as described above for step 622. For example, deployment manager 204 may monitor the updated pricing 430 by querying one or more of the computing platforms 102, may subscribe to one or more of the computing platforms 102 to be notified of updates to pricing 430, etc. Pricing 430 for resources 104 may change quickly or frequently (e.g., hourly) in some computing platforms 102. For example, on-demand pricing 432 may change hourly in a computing platform 102. In another example, a computing platform 102 may offer unused resources 104 at a highly-reduced price in auction-based spot pricing 434. One technical benefit of monitoring for updated pricing 430 is reduced pricing may be found on computing platforms 102 other than where the software 142 is presently deployed.

Deployment manager 204 may also receive updated deployment parameters from the customer 140 (optional step 614), much as described above. Deployment manager 204 identifies downtime of the software 142 deployed on the host computing platform 480 (step 616). Deployment manager 204 then reselects the host computing platform 480 from the plurality of computing platforms 102 based on the updated deployment parameters 410 and/or the updated resource information 412 (step 618). In this embodiment, deployment manager 204 reselects the host computing platform 480 from the plurality of computing platforms 102 based at least on the updated pricing 430. When the deployment manager 204 reselects the same host computing platform 480 where the software 142 is presently deployed, deployment manager 204 does not move the software 142 to another computing platform 102. When the deployment manager 204 reselects a different host computing platform 480 than where the software 142 is presently deployed, deployment manager 204 redeploys the software 142 on the different host computing platform 480 (e.g., cloud computing platform 112) during the downtime of the software 142 (step 620).

The redeployment process is an iterative process, so deployment manager 204 may repeat steps 612-620. One technical benefit is deployment manager 204 may continually search for an optimal pricing from the computing platforms 102 to host the software 142. Thus, the cost of software deployment to the customer 140 may be minimized.

Figure 8:
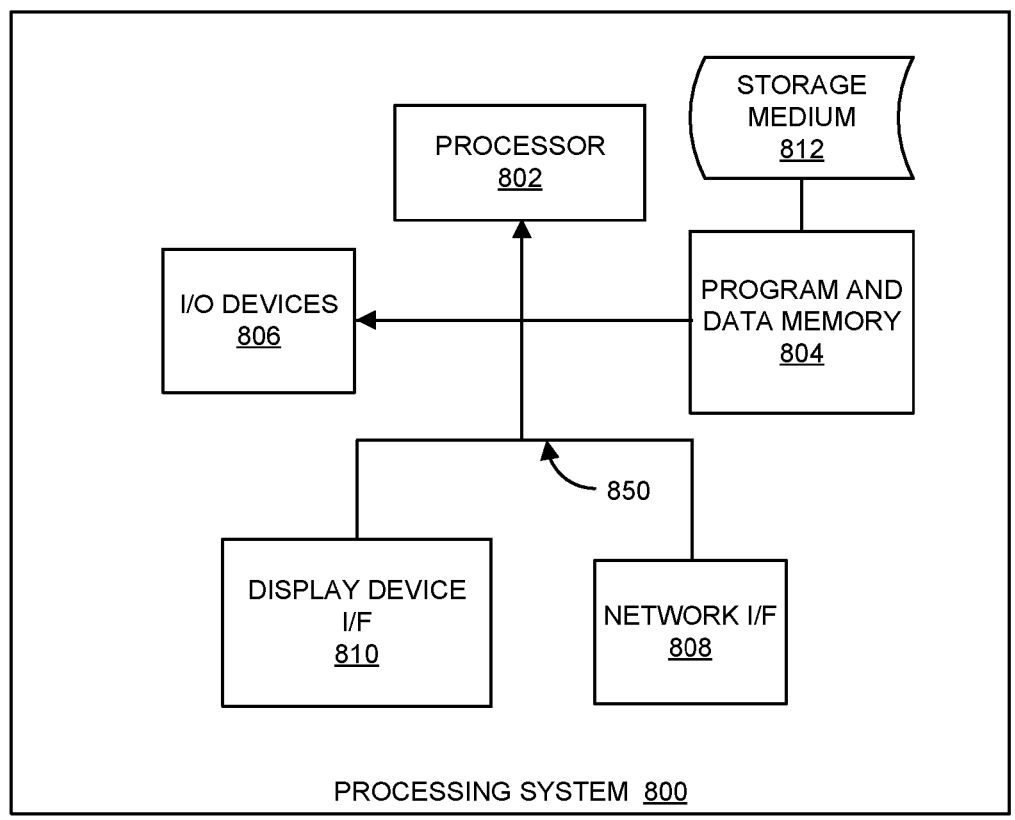
FIG. 8 illustrates a processing system operable to execute a computer readable medium embodying programmed instructions to perform desired functions in an illustrative embodiment.

Embodiments disclosed herein can take the form of software, hardware, firmware, or various combinations thereof. FIG. 8 illustrates a processing system 800 operable to execute a computer readable medium embodying programmed instructions to perform desired functions in an illustrative embodiment. Processing system 800 is operable to perform the above operations by executing programmed instructions tangibly embodied on computer readable storage medium 812. In this regard, embodiments can take the form of a computer program accessible via computer-readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 810 may be integrated with the system to interface to one or more display devices, such as printing systems and screens for presentation of data generated by processor 802.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein Some embodiments pertain to Example 1 that includes a software deployment supervisor comprising at least one processor and memory. The at least one processor is configured to cause the software deployment supervisor at least to receive deployment parameters from an entity regarding deployment of software, identify resource information for resources on a plurality of computing platforms to host the software, select a host computing platform from the plurality of computing platforms based on the deployment parameters and the resource information, and deploy the software on the host computing platform. The at least one processor is configured to further cause the software deployment supervisor at least to implement a redeployment process by iteratively performing: monitoring the resource information to identify updated resource information for one or more of the resources on the plurality of computing platforms, identifying downtime of the software deployed on the host computing platform, reselecting the host computing platform from the plurality of computing platforms based on the deployment parameters and the updated resource information, and redeploying the software on the host computing platform during the downtime of the software when the host computing platform reselected based on the updated resource information differs from the host computing platform where the software is presently deployed.

Example 2 includes the subject matter of Example 1, where the updated resource information comprises updated pricing for one or more of the resources on the plurality of computing platforms, and reselecting the host computing platform comprises reselecting the host computing platform from the plurality of computing platforms based on the updated pricing.

Example 3 includes the subject matter of Examples 1 and 2, where the at least one processor is configured to further cause the software deployment supervisor at least to query at least one of the plurality of computing platforms to obtain the updated pricing.

Example 4 includes the subject matter of Examples 1-3, where the at least one processor is configured to further cause the software deployment supervisor at least to query the at least one of the plurality of computing platforms with a bid for spot pricing.

Example 5 includes the subject matter of Examples 1-4, where the at least one processor is configured to further cause the software deployment supervisor at least to query the at least one of the plurality of computing platforms for on-demand pricing.

Example 6 includes the subject matter of Examples 1-5, where the at least one processor is configured to further cause the software deployment supervisor at least to query the at least one of the plurality of computing platforms through an Application Programming Interface (API) to obtain the updated pricing.

Example 7 includes the subject matter of Examples 1-6, where the at least one processor is configured to further cause the software deployment supervisor at least to implement the redeployment process by further performing: receiving updated deployment parameters from the entity, and reselecting the host computing platform from the plurality of computing platforms based on the updated deployment parameters and the updated resource information.

Example 8 includes the subject matter of Examples 1-7, where the plurality of computing platforms includes multiple cloud computing platforms provided by different cloud service providers.

Example 9 includes the subject matter of Examples 1-8, where the plurality of computing platforms includes an on-premise computing platform.

Example 10 includes the subject matter of Examples 1-9, where a cloud computing platform comprises the software deployment supervisor.

Some embodiments pertain to Example 11 that includes a method of deploying software. The method comprises receiving deployment parameters from an entity regarding deployment of the software, identifying resource information for resources on a plurality of computing platforms to host the software, selecting a host computing platform from the plurality of computing platforms based on the deployment parameters and the resource information, and deploying the software on the host computing platform. The method further comprises implementing a redeployment process by iteratively performing: monitoring the resource information to identify updated resource information for one or more of the resources on the plurality of computing platforms, identifying downtime of the software deployed on the host computing platform, reselecting the host computing platform from the plurality of computing platforms based on the deployment parameters and the updated resource information, and redeploying the software on the host computing platform during the downtime of the software when the host computing platform reselected based on the updated resource information differs from the host computing platform where the software is presently deployed.

Example 12 includes the subject matter of Example 11, where the updated resource information comprises updated pricing for one or more of the resources on the plurality of computing platforms, and reselecting the host computing platform comprises reselecting the host computing platform from the plurality of computing platforms based on the updated pricing.

Example 13 includes the subject matter of Examples 11 and 12, where monitoring the resource information comprises querying at least one of the plurality of computing platforms to obtain the updated pricing.

Example 14 includes the subject matter of Examples 11-13, where querying the at least one of the plurality of computing platforms comprises querying the at least one of the plurality of computing platforms with a bid for spot pricing.

Example 15 includes the subject matter of Examples 11-14, where querying the at least one of the plurality of computing platforms comprises querying the at least one of the plurality of computing platforms for on-demand pricing.

Example 16 includes the subject matter of Examples 11-15, where querying the at least one of the plurality of computing platforms comprises query the at least one of the plurality of computing platforms through an Application Programming Interface (API) to obtain the updated pricing.

Example 17 includes the subject matter of Examples 11-16, where implementing the redeployment process further comprises receiving updated deployment parameters from the entity, and reselecting the host computing platform from the plurality of computing platforms based on the updated deployment parameters and the updated resource information.

Some embodiments pertain to Example 18 that includes a non-transitory computer readable medium embodying programmed instructions executed by a processor, wherein the instructions direct the processor to implement a method of deploying software. The method comprises receiving deployment parameters from an entity regarding deployment of the software, identifying resource information for resources on a plurality of computing platforms to host the software, selecting a host computing platform from the plurality of computing platforms based on the deployment parameters and the resource information, and deploying the software on the host computing platform. The method further comprises implementing a redeployment process by iteratively performing: monitoring the resource information to identify updated resource information for one or more of the resources on the plurality of computing platforms, identifying downtime of the software deployed on the host computing platform, reselecting the host computing platform from the plurality of computing platforms based on the deployment parameters and the updated resource information, and redeploying the software on the host computing platform during the downtime of the software when the host computing platform reselected based on the updated resource information differs from the host computing platform where the software is presently deployed.

Example 19 includes the subject matter of Example 18, where the updated resource information comprises updated pricing for one or more of the resources on the plurality of computing platforms, and reselecting the host computing platform comprises reselecting the host computing platform from the plurality of computing platforms based on the updated pricing.

Example 20 includes the subject matter of Examples 18 and 19, where implementing the redeployment process further comprises receiving updated deployment parameters from the entity, and reselecting the host computing platform from the plurality of computing platforms based on the updated deployment parameters and the updated resource information.

Although specific embodiments were described herein, the scope of the invention is not limited to those specific embodiments. The scope of the invention is defined by the following claims and any equivalents thereof.

What is claimed is:

1. An apparatus, comprising:
   at least one processor and memory;
   the at least one processor is configured to cause the apparatus at least to:
   receive deployment parameters from an entity regarding deployment of software;
   identify resource information for resources on a plurality of computing platforms to host the software;
   select a host computing platform from the plurality of computing platforms based on the deployment parameters and the resource information;
   deploy the software on the host computing platform; and
   implement a redeployment process by iteratively performing:
      monitoring the resource information to identify updated resource information for one or more of the resources on the plurality of computing platforms;
      identifying downtime of the software deployed on the host computing platform;
      reselecting the host computing platform from the plurality of computing platforms based on the deployment parameters and the updated resource information; and
      redeploying the software on the host computing platform during the downtime of the software when the host computing platform reselected based on the updated resource information differs from the host computing platform where the software is presently deployed.

2. The apparatus of claim 1, wherein:
   the updated resource information comprises updated pricing for one or more of the resources on the plurality of computing platforms; and
   reselecting the host computing platform comprises reselecting the host computing platform from the plurality of computing platforms based on the updated pricing.

3. The apparatus of claim 2, wherein the at least one processor is configured to further cause the apparatus at least to:
   query at least one of the plurality of computing platforms to obtain the updated pricing.

4. The apparatus of claim 3, wherein the at least one processor is configured to further cause the apparatus at least to:
   query the at least one of the plurality of computing platforms with a bid for spot pricing.

5. The apparatus of claim 3, wherein the at least one processor is configured to further cause the apparatus at least to:
   query the at least one of the plurality of computing platforms for on-demand pricing.

6. The apparatus of claim 3, wherein the at least one processor is configured to further cause the apparatus at least to:
   query the at least one of the plurality of computing platforms through an Application Programming Interface (API) to obtain the updated pricing.

7. The apparatus of claim 1, wherein the at least one processor is configured to further cause the apparatus at least to:
   implement the redeployment process by further performing:
      receiving updated deployment parameters from the entity; and
      reselecting the host computing platform from the plurality of computing platforms based on the updated deployment parameters and the updated resource information.

8. The apparatus of claim 1, wherein:
   the plurality of computing platforms includes multiple cloud computing platforms provided by different cloud service providers.

9. The apparatus of claim 8, wherein:
   the plurality of computing platforms includes an on-premise computing platform.

10. A cloud computing platform comprising the apparatus of claim 1.

11. A method of deploying software, the method comprising:
   receiving deployment parameters from an entity regarding deployment of the software;
   identifying resource information for resources on a plurality of computing platforms to host the software;
   selecting a host computing platform from the plurality of computing platforms based on the deployment parameters and the resource information;
   deploying the software on the host computing platform; and
   implementing a redeployment process by iteratively performing:

monitoring the resource information to identify updated resource information for one or more of the resources on the plurality of computing platforms;

identifying downtime of the software deployed on the host computing platform;

reselecting the host computing platform from the plurality of computing platforms based on the deployment parameters and the updated resource information; and redeploying the software on the host computing platform during the downtime of the software when the host computing platform reselected based on the updated resource information differs from the host computing platform where the software is presently deployed.

12. The method of claim 11, wherein:

the updated resource information comprises updated pricing for one or more of the resources on the plurality of computing platforms; and reselecting the host computing platform comprises reselecting the host computing platform from the plurality of computing platforms based on the updated pricing.

13. The method of claim 12, wherein monitoring the resource information comprises:

querying at least one of the plurality of computing platforms to obtain the updated pricing.

14. The method of claim 13, wherein querying the at least one of the plurality of computing platforms comprises:

querying the at least one of the plurality of computing platforms with a bid for spot pricing.

15. The method of claim 13, wherein querying the at least one of the plurality of computing platforms comprises:

querying the at least one of the plurality of computing platforms for on-demand pricing.

16. The method of claim 13, wherein querying the at least one of the plurality of computing platforms comprises:

query the at least one of the plurality of computing platforms through an Application Programming Interface (API) to obtain the updated pricing.

17. The method of claim 11, wherein implementing the redeployment process further comprises:

receiving updated deployment parameters from the entity; and reselecting the host computing platform from the plurality of computing platforms based on the updated deployment parameters and the updated resource information.

18. A non-transitory computer readable medium embodying programmed instructions executed by a processor, wherein the instructions direct the processor to implement a method of deploying software, the method comprising:

receiving deployment parameters from an entity regarding deployment of the software;

identifying resource information for resources on a plurality of computing platforms to host the software;

selecting a host computing platform from the plurality of computing platforms based on the deployment parameters and the resource information;

deploying the software on the host computing platform; and implementing a redeployment process by iteratively performing:

monitoring the resource information to identify updated resource information for one or more of the resources on the plurality of computing platforms;

identifying downtime of the software deployed on the host computing platform;

reselecting the host computing platform from the plurality of computing platforms based on the deployment parameters and the updated resource information; and redeploying the software on the host computing platform during the downtime of the software when the host computing platform reselected based on the updated resource information differs from the host computing platform where the software is presently deployed.

19. The computer readable medium of claim 18, wherein:

the updated resource information comprises updated pricing for one or more of the resources on the plurality of computing platforms; and reselecting the host computing platform comprises reselecting the host computing platform from the plurality of computing platforms based on the updated pricing.

20. The computer readable medium of claim 18, wherein implementing the redeployment process further comprises:

receiving updated deployment parameters from the entity; and reselecting the host computing platform from the plurality of computing platforms based on the updated deployment parameters and the updated resource information.

* * * * *